April 23, 1963  C. S. MERTLER ET AL  3,086,399
INDICATOR THERMOSTAT

Filed Oct. 1, 1959  2 Sheets-Sheet 1

INVENTORS.
CHARLES S. MERTLER &
JORGEN G. JESSEN
BY
Woodling and Krost,
ATTORNEYS April 23, 1963    C. S. MERTLER ET AL    3,086,399
INDICATOR THERMOSTAT Filed Oct. 1, 1959    2 Sheets-Sheet 2

INVENTORS.
CHARLES S. MERTLER &
BY   JORGEN G. JESSEN

ATTORNEYS

United States Patent Office 3,086,399
Patented Apr. 23, 1963

3,086,399
INDICATOR THERMOSTAT
Charles S. Mertler, Mansfield, and Jorgen G. Jessen, Belleville, Ohio, assignors to Stevens Manufacturing Company, Inc., a corporation of Ohio
Filed Oct. 1, 1959, Ser. No. 843,741
9 Claims. (Cl. 73—378.3)

The invention relates in general to indicator type thermostats and more particularly to a thermostat which indicates the thermostat has been subjected to a temperature outside a predetermined temperature range.

In the shipping and storage of whole blood it is necessary that the blood be maintained at a temperature below a certain predetermined maximum in order that no spoilage should occur. Under present conditions this is determined as 58° F., which temperature must not be exceeded else the blood will not be usable for transfusions. It is desirable to place a small indicator type thermostat with each batch of whole blood during shipment and storage in order to have positive indication whether or not the blood has been subjected to too high a temperature. It is also desirable that should such temperature be exceeded and then subsequently lowered that the indicator type thermostat would not automatically reset and also be incapable of being manually reset so that should spoilage of a shipment of blood occur, a person may not be able to reset the thermostat and thus avoid detection of the fact that the blood is unusable.

Accordingly, an object of the invention is to provide an indicator type thermostat which will trip upon exceeding predetermined maximum temperature.

Another object of the invention is to provide a thermostat indicating the difference between first and second temperature conditions and which will maintain an alarm condition upon reaching a temperature outside a predetermined range and which will maintain an alarm condition even though the temperature returns to within this temperature range.

Another object of the invention is to provide an indicator thermostat having first and second indicator conditions for temperatures above and below a predetermined temperature.

Another object of the invention is to provide an indicator thermostat with a bimetallic member which moves in one path upon temperature changes to a temperature outside a predetermined range and subsequently moves in a second path to establish an indication of the temperature change.

Still another object of the invention is to provide an indicator thermostat which moves axially during temperature changes in a temperature range and which moves rotationally to indicate that a temperature change outside the temperature range has been encountered and the thermostat may not be rotationally and axially returned to the first mentioned condition without temperature change in the opposite direction completely through the aforementioned temperature range.

Other objects and a fuller understanding of the invention may be had by referring to the following description and claims, taken in conjunction with the accompanying drawings, in which:

Figure 1:
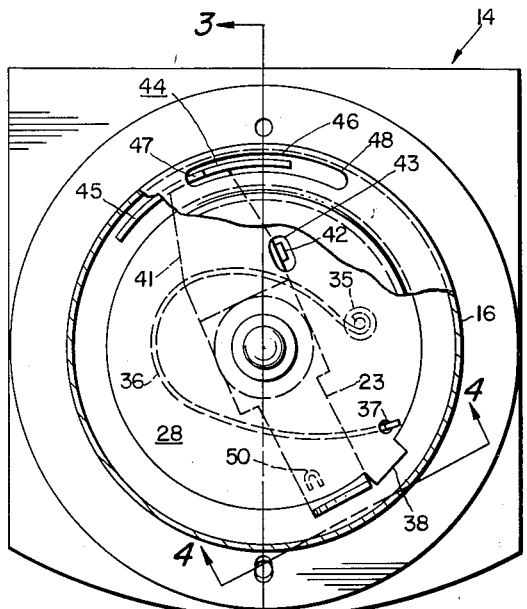
FIGURE 1 is a front view of a thermostat embodying the invention and with the cover partially broken away.
Figure 3:
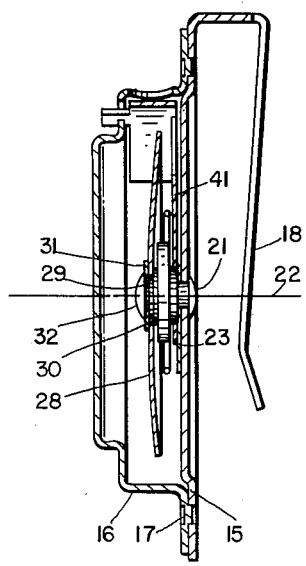
FIGURE 3 is a longitudinal sectional view on line 3—3 of FIGURE 1.
Figure 2:
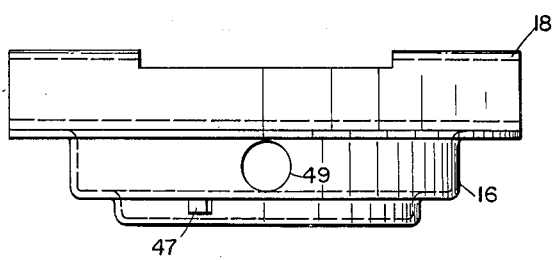
FIGURE 2 is a top view of the thermostat of FIGURE 1.
Figure 4:
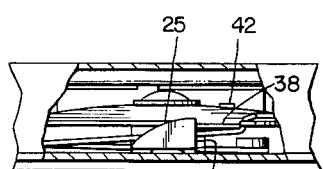
FIGURE 4 is a sectional view on line 4—4 of FIGURE 1.

The FIGURES 1 to 5 show a thermostat 14 embodying the invention and it includes a metal base 15 to which a cover 16 may be secured in any suitable manner, such as by the spot welds 17. A clip 18 is unitarily formed from a part of the base 15 in order that the entire thermostat 14 may be clipped onto some support.

A rivet 21 is securely fastened on a longitudinal center axis 22 of the base 15 and this rivet fixedly attaches to the base a latch plate 23 at a first end of this latch plate. The second end of this latch plate carries a longitudinal face 24 and a cam face 25 which merge together and the cam face 25 is generally parallel to the base 15.

A bimetal disc 28 has a central aperture 29 at which the bimetal disc 28 is journalled between a shoulder 30 of the rivet 21 and a washer 31 held by a head 32 of the rivet 21. A spring post 35 is fixedly attached to the base 15 and a torsion spring 36 has one end attached to the spring post 35 and the other end engaging an aperture 37 in the bimetal disc 28. This torsion spring 36 urges the bimetal disc clockwise as viewed in FIGURE 1. A radially protruding tongue 38 is an integral part of the bimetal disc 28 and is positioned to engage the longitudinal and cam faces of the latch plate 23.

A reset lever 41 is journalled on the rivet 21 and extends generally parallel to the base 15. A first finger 42 is bent generally prependicular to the lever 41 and extends loosely within an aperture 43 in the bimetal disc 28. An arcuate flange 44 is carried on the outer end of the reset lever 41 and includes an alarm indicator portion 45 which may be painted red and a safe indicator portion 46 which may be painted green. A second finger 47 on this arcuate flange extends in a longitudinal direction through an arcuate slot 48 in the cover 16 to the exterior of the enclosure formed by the cover and the base.

Figure 5:
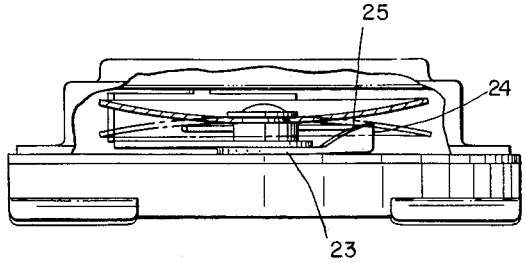
FIGURE 5 is a bottom view of the thermostat with the cover partially broken away and showing the bimetal disc in a second position.
Figure 6:
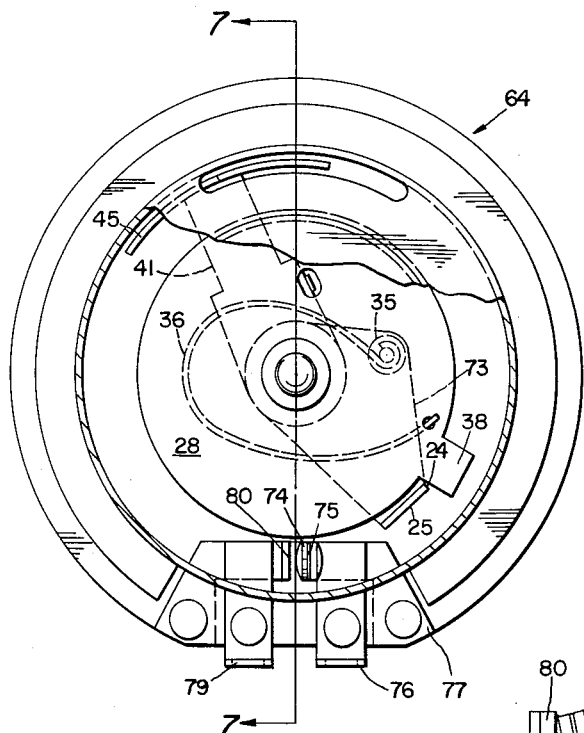
FIGURE 6 is a top view of a modified form of the thermostat with the cover partially broken away.
Figure 7:
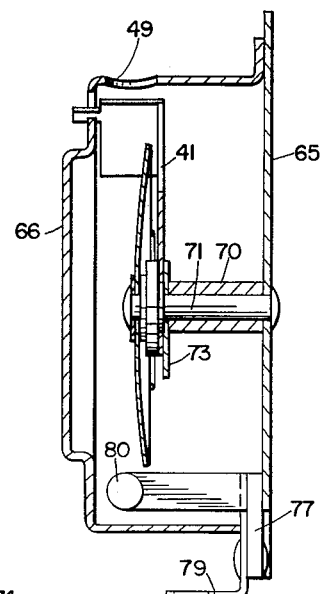
FIGURE 7 is a sectional view on line 7—7 of FIGURE 6.
Figure 9:
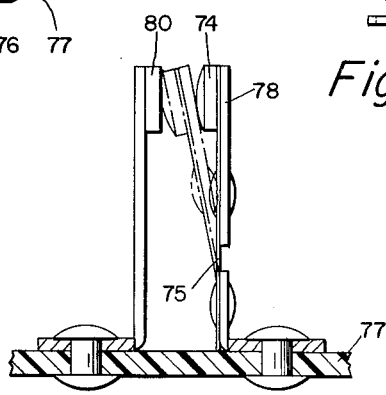
FIGURE 9 is an enlarged partial view of the contacts.
Figure 8:
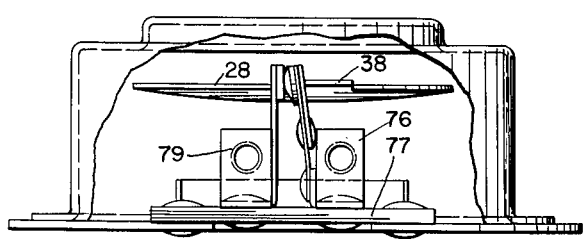
FIGURE 8 is a front view with the cover partially broken away.

The bimetal disc 28 has first and second opposite overcenter conditions and is adapted to snap from one condition to the other. Since the bimetal member 28 is disc-shaped, these opposed conditions will be concavo-convex and these are opposite conditions of stability depending upon the temperature. With the temperature below a predetermined temperature, the bimetal disc will normally assume a first condition of stability as shown in FIGURES 1 to 4, wherein the concave side is toward the base 15. If this first predetermined temperature is exceeded, the bimetal disc will snap over center to the second condition as shown in FIGURE 5, wherein the convex side will be toward the base 15. The bimetal disc 28 and the reset lever 41 also have first and second rotational positions. The first rotational position is that shown in FIGURES 1 to 4, whereat the tongue 38 on the bimetal disc 28 is in a rotational position adapted to engage the longitudinal face 24 of the latch plate 23. The second rotational position is clockwise of the first, as urged by the torsion spring 36 and as shown in FIGURE 5. In this second rotational position the alarm indicator portion 45 is adjacent an apertured window 49 in the cover 16. A tongue 50 may be formed by a U-shaped cut in the base 15 underneath the latch plate 23 so that this tongue 50 may be bent upwardly against the latch plate 23 for adjustment purposes.

Operation

In operation the thermostat 14 is normally in the first condition and the first rotational position as shown in FIGURES 1 to 4. This means that the first condition is where the concave side of the bimetal disc 28 is toward the base 15. The first rotational position then establishes that the tongue 38 is in engagement with the longitudinal face 24. The bimetal disc, being a snap action or over-center device, has a fairly large temperature differential between first and second predetermined temperature at which it will snap over center. When the thermostat 14 is used as a blood temperature indicator thermostat, it is desired that the first predetermined temperature be approximately at 58° F. The thermostat 14 may be clipped onto a case containing one or more containers of whole blood which must be refrigerated during shipment and storage to maintain its usefulness and so that it will not be spoiled to endanger the person to whom it will be given as a transfusion. In the first rotational position and first condition, the safe indicator portion 46 will be adjacent the window 49 and this may be such as to indicate a green flag in the window 49 to indicate that the thermostat is at a safe temperature below 58° F. Upon occurrence of temperature rise exceeding this first predetermined temperature, the bimetal disc 28 will snap over center to the second condition, wherein the disc has its convex side toward the base 15. This provides sufficient longitudinal movement to the tongue 38 so that it longitudinally moves to a disengaged position relative to the longitudinal face 24. Accordingly, the torsion spring will quickly move this bimetal disc 28 and the reset lever 41 to the second rotational position. The alarm indicator portion 45 will then be adjacent the window 49. This will give positive indication to any observer that at some time in the past the thermostat has been subjected to a temperature higher than the first predetermined temperature. The finger 47 may be actuated from outside the enclosure of the thermostat 14 to rotationally return the bimetal disc 28 and reset lever 41 to the first position, however, the tongue 38 will not latch against the longitudinal face 24 as long as the bimetal disc 28 is in the second concavo-convex condition. This is a safety feature so that in case some person carelessly permits a shipment of blood to exceed the first predetermined temperature, that person will not be able to reset the thermostat 14 to show falsely a safe condition. This safety feature is very valuable because if the thermostat were so constructed that it might easily be reset, then a spoiled shipment of blood might easily be indicated to be safe, yet actually not be safe, and thus could endanger human life if used for transfusions.

In order to reset the thermostat 14, it must be cooled to a temperature below the second predetermined temperature. This might be in the order of 30° F. at which the bimetal disc will snap over center to the first condition in which the concave side is toward the base 15. In this condition the finger 47 may be actuated to rotationally return the reset lever 41 and bimetal disc 28 counterclockwise to the first rotational position. During such movement, the tongue 38 will climb over the cam face 25 but will not snap over to the second condition. The resiliency of the bimetal disc 28 permits this slight distorsion of sliding over the cam face 25 until in a rotational position whereat the tongue 38 engages the longitudinal face 24. The tongue 50 may be bent upward or downward relative to the rest of the base 15 in order to adjust the position of the latch plate 23, and hence, make certain that the latch tongue 38 will become disengaged from the longitudinal face 24 at the completion of its snapping over from the first to the second condition.

FIGURES 6 to 9 show a modification of the invention with a thermostat 64 having a base 65 and a cover 66. The cover 66 is deeper to accommodate an elongated rivet 71 fixedly attached to the base 65 and maintained in position by a spacer bushing 70. Parts in the thermostat 64, the same as parts in the thermostat 14 bear the same reference numerals. A latch plate 73 is fixed on the rivet 71 relative to the base 65 and this latch plate 73 carries the spring post 35. The bimetal disc 28 has the tongue 38 which engages with the latch plate faces 24 and 25 and additionally this latch tongue 38 is adapted to actuate a movable contact 74. This movable contact is mounted on a resilient arm 75 and electrically connected to a first terminal 76 mounted on an insulator 77 fixed to the base 65. An insulator bar 78 is fixed to the back of the resilient arm 75 for engagement by the latch tongue 38. A second terminal 79 is mounted on the insulator 77 and electrically connected to a fixed contact 80 disposed to be engaged by the movable contact 74. The normal resiliency of the resilient arm 75 maintains the contacts 74 and 80 disengaged when the bimetal disc 28 is in the first rotational position as shown in the FIGURES 6 and 7. However, when the bimetal disc 28 has snapped from the first to the second conditions and the torsion spring 36 has rotated the bimetal disc 28 clockwise to the second rotational position, the tongue 38 strikes insulator bar 78 to close the contacts 74 and 80. This will provide an electrical indication of the change from the first to the second rotational position of the bimetal disc 28 and the reset lever 41. Additionally, the alarm indicator portion 45 on the reset lever 41 may be used as a visual indication of an unsafe condition at the window 49. When the bimetal disc 28 has been reset to the first condition and first rotational position, the contacts 74 and 80 will again be in an open circuit condition.

The indicator thermostat of the invention therefore, provides either a visual or electrical indication of a change in temperature to one outside a predetermined temperature range and the thermostat may not easily be reset to its initial condition. The change in temperature which causes the bimetal disc 28 to snap over center is a longitudinal movement in a first path and then since the tongue 38 is disengaged from the longitudinal face 24, the torsion spring 36 causes a rotational movement to the second rotational position which is a movement in a second path. These movements in the first and second paths are generally perpendicular so that each movement is generally independent of the other. Movement in the first path permits the thermostat to become unlatched and movement in the second path establishes the indication either visual or electrical.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An indicator thermostat comprising, in combination, a base, bimetal means in said thermostat, said bimetal means movable in a first path with a snap action between first and second conditions in response to temperature changes, means mounting said bimetal means in said thermostat for movement in a second path generally perpendicular to said first path, a latch on said base, a face on said latch generally parallel to said first path, a tongue movable by said bimetal means generally parallel to said first path and adapted for latching engagement with said latch face, contact means carried on said base, spring means acting on said bimetal means to urge same in said second path from a first position whereat said tongue is in latching engagement with said latch face toward a second position, means to actuate said contact means by movement of said bimetal means in said second path, indicator means in said thermostat indicating the difference between said first and second positions of said bimetal means, and means establishing said tongue in latching engagement with said latch face with said bimetal means in said first position and first condition and establishing movement of said tongue generally parallel to said first path to a position disengaged from said latch face with said bimetal means moved to said second condition, whereby said spring means moves said bimetal means in said second path to said second position to actuate said contact means.

2. An indicator thermostat comprising, in combination, a base, bimetal means journalled on an axis of said thermostat, a latch on said base, a longitudinal face on said latch, a tongue axially movable by said bimetal means adapted for latching engagement with said latch face, spring means acting on said bimetal means to urge same from a first rotational position whereat said tongue is in latching engagement with said longitudinal face of said latch toward a second rotational position, first and second contacts carried on said base, means to actuate said contacts by rotation of said bimetal means, indicator means in said thermostat indicating the difference between said first and second rotational positions of said bimetal means, said bimetal means having first and second conditions and adapted to change from one of said conditions to the other thereof upon being heated above a predetermined temperature, and means establishing said tongue in latching engagement with said longitudinal face with said bimetal means in said first rotational position and first condition and establishing longitudinal movement of said tongue to a position disengaged from said longitudinal face of said latch with said bimetal means moved to said second condition, whereby said spring means partially rotates said bimetal means on said axis to said second rotational position to actuate said contacts.

3. An indicator thermostat comprising, in combination, a base, bimetal means journalled on an axis of said thermostat, a latch on said base, a longitudinal face on said latch, a tongue axially movable by said bimetal means adapted for latching engagement with said latch face, spring means acting on said bimetal means to urge same from a first rotational position whereat said tongue is in latching engagement with said longitudinal face of said latch toward a second rotational position, first and second contacts carried on said base, means to actuate said contacts in accordance with rotation of said bimetal means, indicator means in said thermostat indicating the difference between said first and second rotational positions of said bimetal means, said bimetal means having first and second opposite over-center conditions and adapted to deflect with a snap action from one of said conditions to the other thereof upon being heated above a predetermined temperature, and means establishing said tongue in latching engagement with said longitudinal face with said bimetal means in said first rotational position and first condition and establishing longitudinal movement of said tongue to a position disengaged from said longitudinal face of said latch with said bimetal means moved to said second condition, whereby said spring means partially rotates said bimetal means on said axis to said second rotational position to actuate said contacts.

4. An indicator thermostat comprising, in combination, a base, bimetal means journalled on an axis of said thermostat, a latch on said base, a longitudinal face on said latch, a tongue axially movable by said bimetal means adapted for latching engagement with said latch longitudinal face, a spring acting on said bimetal means to urge same from a first rotational position whereat said tongue is in latching engagement with said longitudinal face of said latch toward a second rotational position, indicator means in said thermostat indicating the difference between said first and second rotational positions of said bimetal means, a cover fastened to said base and providing an enclosure for said thermostat, an arcuate slot in said cover, a finger extending through said arcuate slot to the exterior of said enclosure and acting on said bimetal means, said bimetal means having first and second opposite concavo-convex conditions and adapted to deflect with a snap action from the first to the second concavo-convex condition upon being heated above a predetermined temperature, and said bimetal means in said first rotational position and first condition establishes said tongue latching in engagement with said longitudinal face and upon said bimetal means being heated above said predetermined temperature said bimetal means snaps to said second condition whereat said tongue is longitudinally moved to a position disengaged from said longitudinal face of said latch and said spring partially rotates said bimetal means on said axis to said second rotational position.

5. An indicator thermostat comprising, in combination, a base, a bimetal disc journalled on a longitudinal axis of said thermostat, a latch fixed relative to said base, a longitudinal face and a cam face on said latch, a tongue on said bimetal disc adapted for engagement with said latch faces, a torsion spring acting on said bimetal disc to urge same from a first rotational position whereat said tongue is in latching engagement with said longitudinal face of said latch toward a second rotational position, first and second contacts on said base, said tongue actuating said contacts by rotational movement of said bimetal disc, indicator means in said thermostat indicating the difference between said first and second rotational positions of said bimetal disc, a cover fastened to said base and providing an enclosure for said thermostat, an arcuate slot in said cover, a finger extending through said arcuate slot to the exterior of said enclosure and acting on said bimetal disc, said bimetal disc having first and second opposite concavo-convex conditions and adapted to deflect with a snap action from the first to the second concavo-convex condition upon being heated above a predetermined temperature, whereby said bimetal disc in said first rotational position and first condition has said tongue in latching engagement with said longitudinal face and upon said disc being heated above said predetermined temperature said disc snaps to said second condition whereat said tongue is longitudinally moved to a position disengaged from said longitudinal face of said latch and said torsion spring partially rotates said bimetal disc on said axis to said second rotational position to actuate said contacts, and whereby said bimetal disc must be cooled below a second predetermined temperature to again snap to said first condition whereupon said finger may be actuated to rotationally return said bimetal disc to said first rotational position with said tongue sliding over said cam face to latch against said longitudinal face.

6. An indicator thermostat comprising, in combination, a base, a longitudinal axis on said thermostat, a latch plate fixedly attached to said base, a longitudinal face and a cam face merging therewith on said latch plate, a longitudinally movable latch tongue adapted for engagement with said latch plate faces, a reset lever journalled on said axis, a torsion spring acting on said reset lever to urge same from a first rotational position whereat said tongue is in latching engagement with said longitudinal face of said latch toward a second rotational position, a cover fastened to said base and providing an enclosure for the parts of the thermostat, an apertured window in said cover adjacent said reset lever, an alarm indicator portion on said reset lever movable adjacent to said window, an arcuate slot in said cover, a finger on said reset lever extending through said arcuate slot to the exterior of said enclosure, and a bimetal disc mounted coaxially in said thermostat and acting to longitudinally move said latch tongue, said bimetal disc having first and second opposite concavo-convex conditions and adapted to deflect with a snap action from the first to the second concavo-convex condition upon being heated above a predetermined temperature, whereby said bimetal disc in said first condition and said reset lever in said first rotational position establishes said latch tongue in latching engagement with said longitudinal face to establish said reset lever alarm indicator portion away from said window and upon said disc being heated above said predetermined temperature said disc snaps to said second condition whereat said tongue is longitudinally moved to a position disengaged from said longitudinal face of said latch and said torsion spring partially rotates said reset lever on said axis to said second rotational position whereat said alarm indicator portion is adjacent said window, and whereby said bimetal disc must be cooled below a second predetermined temperature to again snap to said first condition whereupon said finger may be actuated to rotationally return said reset lever to said first rotational position with said tongue sliding over said cam face to latch against said longitudinal face.

7. An indicator thermostat comprising, in combination, a base, a latch plate fixedly attached to said base, a bimetal disc centrally apertured and journalled thereat on a central axis of said thermostat, a longitudinal face and a cam face merging therewith on said latch plate, a radially protruding tongue on said bimetal disc adapted for engagement with said latch plate faces, a torsion spring engaging and acting on said bimetal disc to urge same from a first rotational position whereat said tongue is in latching engagement with said longitudinal face of said latch toward a second rotational position, a reset lever journalled on said central axis, a first finger on said reset lever engageable with sides of an aperture in said bimetal disc, a cover fastened to said base and providing an enclosure for the parts of the thermostat, an arcuate slot in said cover, a second finger on said reset lever extending through said arcuate slot to the exterior of said enclosure, fixed and movable cooperating contacts on said base near said tongue, said bimetal disc having first and second opposite concavo-convex conditions and adapted to deflect with a snap action from the first to the second concavo-convex condition upon temperature change in a first direction beyond a predetermined temperature, whereby said bimetal disc in said first rotational position and first condition has said tongue in engagement with said longitudinal face to establish said contacts in disengaged condition and upon said disc undergoing a temperature change in a first direction beyond said predetermined temperature said disc snaps to said second condition whereat said tongue is longitudinally moved to a position disengaged from said longitudinal face of said latch and said torsion spring partially rotates said bimetal disc and said reset lever to said second rotational position and said tongue moves said movable contact to engage said fixed contact, and whereby said bimetal disc must undergo a temperature change in the opposite direction beyond a second predetermined temperature to again snap to said first condition whereupon said second finger may be actuated to rotationally return said bimetal disc to said first rotational position with said tongue sliding over said cam face to latch against said longitudinal face.

8. An indicator thermostat comprising, in combination, a metallic base, a latch plate having a first end fixedly attached by a rivet on a central axis of said thermostat, a bimetal disc centrally apertured and journalled thereat on said rivet, a longitudinal face and a cam face merging therewith on a second end of said latch plate, a radially protruding tongue on said bimetal disc adapted for engagement with said latch plate faces, a spring post fixedly carried relative to said base, a torsion spring having one end fastened on said spring post and the other end engaging and acting on said bimetal disc to urge same from a first rotational position whereat said tongue is in engagement with said longitudinal face of said latch toward a second rotational position, a reset lever journalled on said rivet, a first finger on said reset lever engageable with sides of an aperture in said bimetal disc, a cover welded to said base and providing an enclosure for the parts of the thermostat, an apertured window in said cover adjacent said reset lever, red and green portions on said reset lever movable adjacent to said window, an arcuate slot in said cover, a second finger on said reset lever extending through said arcuate slot to the exterior of said enclosure, a fixed contact mounted on said base, an elastic contact blade mounted on said base, a movable contact on said elastic contact blade disposed for cooperation with said first contact and normally disengaged therefrom, an insulator block on said elastic contact blade on the face opposite said movable contact, said bimetal disc having first and second opposite concavo-convex conditions and adapted to deflect with a snap action from the first to the second concavo-convex condition upon being heated above a predetermined temperature, whereby said bimetal disc in said first rotational position and first condition has said tongue in engagement with said longitudinal face to establish said reset lever green portion adjacent said window and upon said disc being heated above said predetermined temperature said disc snaps to said second condition whereat said tongue is longitudinally moved to a position disengaged from said longitudinal face of said latch and said torsion spring partially rotates said bimetal disc on said rivet to said second rotational position whereat said tongue engages said insulator block to close said contacts and said first finger also moves said reset lever to a position whereat said red portion is adjacent said window, and whereby said bimetal disc must be cooled below a second predetermined temperature to again snap to said first condition whereupon said second finger may be actuated to rotationally return said bimetal disc to said first rotational position to open said contacts and with said tongue sliding over said cam face to latch against said longitudinal face.

9. An indicator thermostat comprising, in combination, a base,
 a latch plate fixedly attached to said base,
 a bimetal disc centrally apertured and journalled thereat on a central axis of said thermostat,
 a longitudinal face and a cam face merging therewith on said latch plate,
 a radially protruding tongue on said bimetal disc adapted for engagement with said latch plate faces,
 a torsion spring having one end fastened relative to said base and the other end engaging and acting on said bimetal disc to urge same from a first rotational position whereat said tongue is in engagement with said longitudinal face of said latch toward a second rotational position,
 a reset lever journalled on said central axis,
 a first finger on said reset lever engageable with sides of an aperture in said bimetal disc,
 a cover fixed to said base and providing an enclosure for the parts of the thermostat,
 an apertured window in said cover adjacent said reset lever,
 red and green portions on said reset lever movable adjacent to said window,
 an arcuate slot in said cover,
 a second finger on said reset lever extending through said arcuate slot to the exterior of said enclosure,
 a fixed contact mounted on said base,
 an elastic contact blade mounted on said base,
 a movable contact on said elastic contact blade disposed for cooperation with said first contact and normally disengaged therefrom,
 an insulator block on said elastic contact blade on the face opposite said movable contact,
 said bimetal disc having first and second opposite concavo-convex conditions and adapted to deflect with a snap action from the first to the second concavo-convex condition upon temperature change in a first direction beyond a predetermined temperature to longitudinally move said tongue to a position disengaged from said longitudinal face of said latch and said torsion spring partially rotates said bimetal disc to said second rotational position to change from a green to a red indication at said window and whereat said tongue engages said insulator block to close said contacts, and upon temperature change in the opposite direction beyond a second predetermined temperature said bimetal disc will snap to said first condition whereupon said second finger may be actuated to rotationally return said bimetal disc to said first rotational position to open said contacts and with said tongue sliding over said cam face to latch against said longitudinal face.

References Cited in the file of this patent

UNITED STATES PATENTS

| | | |
|---|---|---|
| 1,662,621 | Reichold | Mar. 13, 1928 |
| 2,116,436 | Kriegstedt | May 3, 1938 |
| 2,327,336 | Bolesky | Aug. 24, 1943 |
| 2,750,916 | Hanington | June 19, 1956 |